United States Patent Office 2,879,169
Patented Mar. 24, 1959

2,879,169

MOLD DRESSING FOR CASTING NON-FERROUS METALS

Harry Teicher, Arlington, Mass., assignor to Monsanto Chemical Company, St. Louis, Mo., a corporation of Delaware No Drawing. Application April 21, 1955
Serial No. 503,025

9 Claims. (Cl. 106—38.27)

This invention relates to a novel, improved mold-dressing and tool-dressing composition and to the process of casting non-ferrous metals wherein the subject composition is employed to coat the mold and/or tool surface otherwise in contact with the molten metal.

More specifically this invention relates to a composition of finely divided bone ash to which a minor amount of an acid phosphate material has been uniformly incorporated therewith.

Bone ash has long been employed as a mold dressing, particularly in the copper industry. Bone ash is produced by the calcination of degreased cattle bones after glue extraction and has long been regarded as principally tricalcium phosphate ($Ca_3(PO_4)_2$), but recent X-ray analysis studies have shown that it is a mixture of about 75-80 percent hydroxyapatite ($Ca_5(PO_4)_3OH$) and about 25-20 percent of $\beta$-tricalcium phosphate. Bone ash median particle size has been shown to be about 20 microns; and comprise aggregates of microcrystalline particle size from about 0.1 to about 1.0 micron as measured by an electron microscope.

Also a variety of other refractory mold dressings have been used in casting various metals and alloys. The mold dressings are necessary to prevent adhesion of the metal to the mold, provide a smooth ingot surface, extend mold life by reducing direct wear, provide an inert film between mold and metal to avoid contamination of the latter, etc.

One object of the instant invention is to provide a new modified bone ash composition having improved properties over prior bone ash materials.

Another object of this invention is to improve the coating and adhesion performance of bone ash on the various mold materials employed in the metal-casting industry.

A further object of this invention is to provide an improved mold-dressing slurry for coating mild-steel and cast-iron molds employed in casting aluminum.

An additional object of this invention is to provide an adherent coating composition which can be employed as a tool dressing in the aluminum- and steel-casting industry.

It has now been found that the addition of small amounts of an acid phosphate material to bone ash provides many advantages over the use of bone ash alone. Preferably a solid acid phosphate material is employed to facilitate dry blending. The solid acid phosphate material can be added in amounts to provide a final composition containing from about 5 to about 20 percent thereof; and preferably from about 5 to about 10 percent, or more preferably still, from about 7 to about 8 percent, of the dry mixture consists of the solid acid phosphate. Thus the bone ash will generally range from about 95 to about 80, about 95 to about 90, and about 93 to about 92 percent, respectively, of the dry composition. The modified bone ash formulation can also be prepared by wet blending the bone ash and solid acid phosphate in water in the proper ratio to give the desired slurry by moderate to vigorous agitation to directly prepare the mold dressing.

Suitable anhydrous solid acid phosphates are, for example, monocalcium orthophosphate, monosodium orthophosphate, monopotassium orthophosphate, monosodium potassium orthophosphate and the like and mixtures thereof. The calcium salt is the preferred embodiment.

Preferably the pH of the modified bone ash slurry should not be materially greater than about 7. The preferred pH range is from about 6 to about 7, but lower pH values to about pH 4 can be employed where their use is not deleterious to the molds. Since the coatings are anhydrous when in contact with the cast metal, the initial pH of the aqueous slurry does not create a corrosion problem to the cast metal.

It has also been found possible to obtain the improved properties of the modified bone ash mold dressing by forming the acid phosphate in situ by the addition of phosphoric acid to the bone ash to the desired slurry pH end-point, e. g., about pH 6.0 to about 7.0. The phosphoric acid can be added to an aqueous slurry of the bone ash to the desired pH value or phosphoric acid can be added to a well agitated mass of dry bone ash and agitation continued until the material is substantially uniform.

It was found that a modified bone ash composition containing about 5 percent of monocalcium orthophosphate had a slurry pH of about 7, whereas the formulations containing monosodium orthophosphate and monopotassium orthophosphate required about 7 percent thereof to provide similar pH values. About 7.5 percent of the calcium salt was required to provide a pH of about 6, and the sodium and potassium salts when present in the amount of 10.5 percent gave pH values of about 6.5. It is understood that, since bone ash per se is not a uniform material, different sources of bone ash will modify the above results.

The disclosed modified bone ash compositions are particularly useful as a mold dressing in the casting of aluminum, and aluminum alloys, as well as copper and copper alloys such as brass and aluminum bronze, and can also be employed to cast magnesium and other metals.

The mold dressing is prepared by suspending the desired amount of material in water to provide the desired consistency (usually from about 10 to about 30 percent total solids and preferably from about 15 to about 25 percent total solids) by agitating the mixture to provide a uniform suspension. The suspension is then employed as a mold wash, or may be applied to the hot mold by spray or brush application, as well known in the art. Generally the mold dressing is applied to a hot mold such that there is sufficient heat to volatilize all moisture from the coating slurry. Where a mold may be coated cold it is necessary that the coated mold be heated under conditions which will remove all moisture prior to employing the mold for casting. Particular care must be used to inspect the molds for fine surface cracks when the cold-coating procedure is employed, since the fine, deep cracks will tend to retain the moisture during the subsequent drying operation. The use of hot molds will substantially avoid moisture penetration of fine surface cracks, which might be present, and is a safer procedure than coating cold molds.

The bone ash-acid phosphate formulations were found to possess excellent specific adhesion to copper, cast-iron and steel molds and can thereby be employed with the conventional batch-type, air-cooled and water-cooled molds employed in the casting industry. The casting of various ingots and other articles such as aluminum pigs, copper horizontal wire-bars, electrolytic copper cathodes, etc. for subsequent rolling, extrusion, pressing, forging, or other processing and use, involves proper control of pouring temperature and mold temperature depending on the material being cast, and for best results the proper choice of mold dressing is important to provide an ingot having the desired smooth skin free from blemishes and flaws, since spurs and other irregularities may cause locking in the casting, i. e., may cause the ingot to hang up during freezing. The uniform coating provided by the bone ash-acid phosphate composition and the excellent adhesive and cohesive properties thereof enables the build up of heavier coatings per unit area than the prior art coatings without danger of easily chalking off. Thus where desirable the heavier coatings provide a better insulation between the molten metal and the mold whereby desired linear freezing of the metal is achieved, cold-shuts are reduced, and mold life is extended by the lessened thermal shock.

An improved mold dressing formulation was prepared by uniformly dry blending 7.0 parts by weight of finely divided anhydrous monocalcium orthophosphate with 93.0 parts by weight of Monsanto standard molding bone ash. The monocalcium orthophosphate had the following standard screen analysis: 60 percent through 325, 80 percent through 200, and 90 percent through 150; and the bone ash was 95 to 97 percent through 325. An aqueous 16° Bé. slurry was prepared by stirring the mixture for about 30 minutes. The slurry had a pH of 6.4.

The coating characteristics were evaluated by dipping standard copper thimbles into the uniform mold-dressing slurry. The thimbles were substantially filled with mercury, to provide a heat reservoir, and heated to 140° C. then they were quickly dipped twice, with a rapid uniform motion, into the mold-dressing slurry and allowed to cool. The heat contained in the thimble vaporized the water in the adherent coating and the weight of coating picked up and the relative specific adhesion of the coating to the mold were determined.

It was found that the above-disclosed modified bone ash formulation provided a 41 percent heavier coating per unit of area than a comparable bone ash slurry (without addition of the monocalcium orthophosphate) treated in the same manner. It was also found that the modified bone ash coating had superior adhesion over the bone ash coating alone. Thus whereas the unmodified bone ash coating chalks off relatively easily the modified bone ash formulation adheres tenaciously and resists abrasion in the dry state, but can be readily washed off. Thus the modified bone ash coating gives longer and superior service than the unmodified coating, but still can be readily removed by washing when it is desired to recoat the mold at periodic intervals.

The modified bone ash mold dressing was also found to have improved adhesion on mild-steel and cast-iron molds. The adhesion to mild-steel molds was experimentally determined in a similar manner to the procedure employed with copper molds except that the temperature of the mold was held at about 115° C. rather than 140° C.

Field evaluation in an aluminum-casting plant proved the modified bone ash, containing about 8 percent of monocalcium orthophosphate, mold dressing to be superior to any materials previously tested. The mold dressing was sprayed into cast-iron molds for the production of 50-pound pigs and into steel molds for production of the 700-pound ingots. The molds are either sprayed while hot and/or are heated, after spraying to remove all moisture from the mold and coating before casting of the metal. It was found that the modified bone ash formulation lasted at least seven times longer than the prior coating composition thereby producing a greater number of castings without need to recoat. The strongly adherent modified bone ash coating is particularly important in the casting of aluminum as it provides a continuous, uniform film which precludes absorption of the iron by the aluminum.

A further benefit has been noted in the use of the modified bone ash coating in that it has been observed that the use of the coating passivates the steel surface of the mold thereby providing additional mold life by reduced corrosion and simultaneously reduces the hazard of entrapped oxide films from the mold wall getting into the melt.

I claim:

1. An improved tool- and mold-dressing composition consisting of a uniform mixture of from about 95 to about 80 percent by weight of finely divided bone ash and from about 5 to about 20 percent by weight of an acid phosphate selected from the group consisting of phosphoric acid, monocalcium orthophosphate, monosodium orthophosphate, monopotassium orthophosphate, monosodium potassium orthophosphate, and mixtures thereof such that an aqueous slurry of said mixture has a pH between about 4 and about 7.

2. The composition of claim 1, wherein the pH is between about 6 and about 7.

3. The composition of claim 2, wherein the acid phosphate is orthophosphoric acid.

4. The composition of claim 2, wherein the acid phosphate is a finely divided solid acid phosphate.

5. The composition of claim 3, wherein the acid phosphate is monocalcium orthophosphate.

6. The composition of claim 3, wherein the acid phosphate is monosodium orthophosphate.

7. The composition of claim 3 wherein the acid phosphate is monopotassium orthophosphate.

8. The composition of claim 3, wherein the acid phosphate is monosodium potassium orthophosphate.

9. An improved tool- and mold-dressing composition consisting of a uniform mixture of from about 95 to about 90 percent by weight of finely divided bone ash and from about 5 to about 10 percent by weight of finely divided monocalcium orthophosphate.

References Cited in the file of this patent

UNITED STATES PATENTS

| Number | Name | Date |
| --- | --- | --- |
| 2,116,207 | Lindner et al. | May 3, 1938 |
| 2,499,028 | Kunze | Feb. 28, 1950 |
| 2,618,530 | Gardner | Nov. 18, 1952 |

FOREIGN PATENTS

| Number | Country | Date |
| --- | --- | --- |
| 694,148 | Germany | July 16, 1940 |
| 707,554 | Germany | June 25, 1941 |